Figure 1:
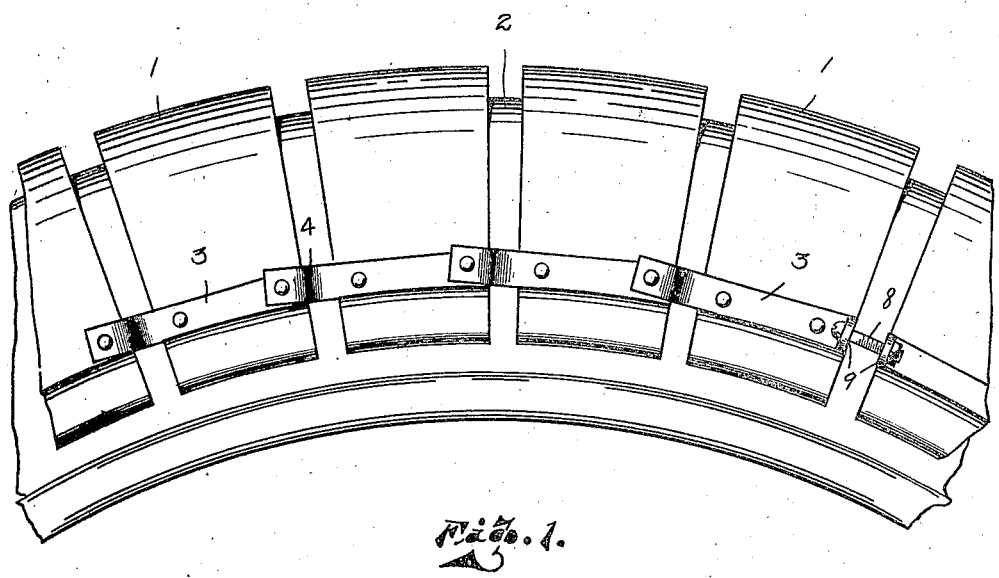

Mar. 13, 1923.

H. B. RAYMOND ET AL.
TIRE ARMOR.
FILED JULY 3, 1922.

1,448,150.

Inventors
Harry B. Raymond
Roy J. Baker
Geo. Stevens
Attorney

Patented Mar. 13, 1923.

1,448,150

UNITED STATES PATENT OFFICE.

HARRY B. RAYMOND AND ROY J. BAKER, OF DULUTH, MINNESOTA.

TIRE ARMOR.

Application filed July 3, 1922. Serial No. 572,507.

*To all whom it may concern:*

Be it known that we, HARRY B. RAYMOND and ROY J. BAKER, each a citizen of the United States, residing at Duluth, in the county of St. Louis and State of Minnesota, have invented certain new and useful Improvements in Tire Armors, of which the following is a specification, reference being had therein to the accompanying drawing.

This invention relates to tire armors and has special reference to that type of armor made up of a plurality of pieces of tire casing.

The object of the present invention is to provide a novel and more practical form of linking device for uniting and supporting the various sections of the tread members.

We are aware that yieldable linking members have been employed for this purpose, but not of the type here illustrated, or of a kind having the advantages of this novel structure.

Figure 2:
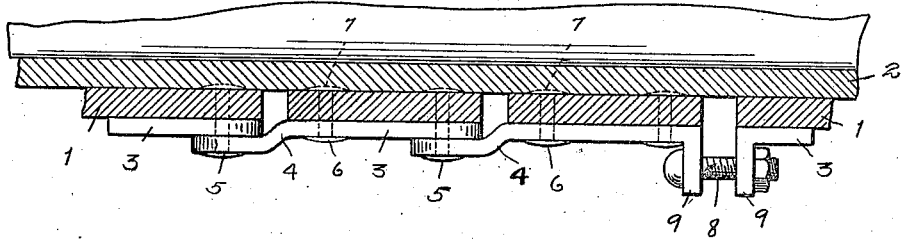

Referring to the accompanying drawing forming part of this application and in which like reference characters indicate like parts:

Figure 1 is a side elevation of a section of the improved armor as applied to a tire, Figure 2 is an enlarged sectional view through a portion of the armor and tire, showing a plan view of the linking device.

1 represents the sections of tire casing which are mounted upon the tire 2, and held together as well as upon the tire 2 by the linking members 3, which are each composed of a piece of strap metal, rectangularly shaped in cross-section, and offset adjacent one end, as at 4, just the thickness of itself, to accommodate the next adjacent member by the overlapping of same. Through such overlapped portion are installed the engaging bolts or rivets, indicated at 5, which extend through the sections 1, and have somewhat convex heads therein so as not to unduely abrase the tire to which they are attached. The offset portion 4 of each member occurs in the gap between the two space casing sections and the member is firmly attached adjacent said offset portion to its respective casing section by a shorter second rivet 6 which also is provided with a convex rounded head 7 upon the inner end thereof, similar to the heads of the longer rivets.

While the rivet 6 is drawn up tightly in the construction the rivet 5 is left with just sufficient slack to permit of yieldability in the device to conform to the desired shape, but, as is evident, no moving part of the members engages the tire to which the armor is applied.

Equally spaced about the ring of such armor and preferably four in number on each side, are holding and adjusting bolts 8, they being engaged within holes in the lugs 9 formed upon the ends of the two adjacent linking members 3, by which arrangement the armor is conveniently assembled or removed from a wheel tire.

By this means a firm union between each linking member and its respective casing section is established and no resiliency or yielding occurs between adjacent sections except that the two cooperative pivotally united ones are free to move pivotally, said pivotal connection being provided with flat bearing surfaces about the pivotal point, thus holding same in comparatively true alignment about the tire.

Having thus described our invention, what we claim and desire to secure by Letters Patent, is:

1. A linking device for sectional tire armor comprising a member having a straight flat body portion with one end thereof offset the thickness of same for overlapping engagement with the body portion of the succeeding member, holding rivets extending through such united members and the sections of the armor for holding attachment to the armor and pivotal connection with the members, and a second shorter rivet adjacent the offset portion for holding attachment to the armor sections, substantialy as described.

2. A linking device for sectional tire armor of the character described comprising flat pivotally united links carried by the sections of the armor, laterally projecting lugs on certain of said links having holes therethrough, and holding bolts through said lugs for adjustably uniting the armor.

In testimony whereof we hereunto affix our signatures in the presence of two witnesses.

HARRY B. RAYMOND.
ROY J. BAKER.

Witnesses:
S. C. BRONSON,
S. GEO. STEVENS.